Mar. 20, 1923.
G. O. MATTER
LOCK NUT
Original Filed Dec. 4, 1920
1,449,013
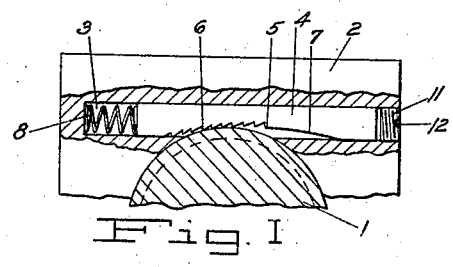
Fig. I
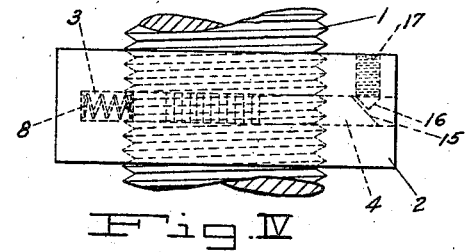
Fig. IV
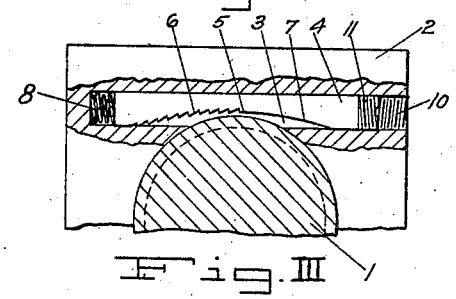
Fig. III
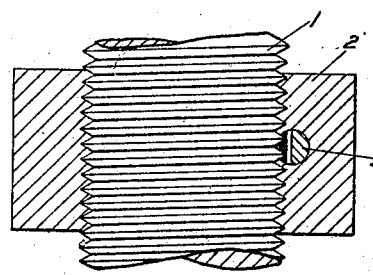
Fig. 2.
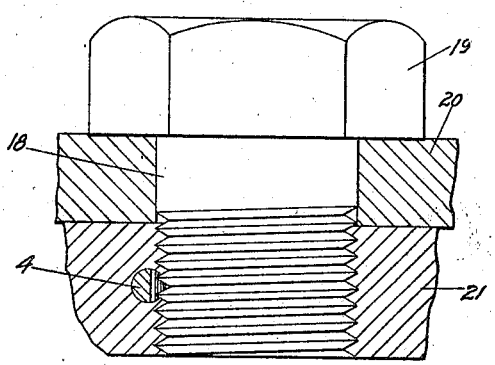
Fig. V
INVENTOR:
Gustave O. Matter,
BY
Atkins & Atkins
ATTORNEYS, Patented Mar. 20, 1923.

1,449,013

UNITED STATES PATENT OFFICE.

GUSTAVE O. MATTER, OF PORTLAND, OREGON, ASSIGNOR TO ROBERT A. DUNCAN, J. R. THIEHOFF, J. H. McCOY, WILLIAM PENIGOR, AND K. C. WHITESELL, ALL OF PORTLAND, OREGON.

LOCK NUT.

Application filed December 4, 1920, Serial No. 428,244. Renewed August 16, 1922. Serial No. 582,250.

*To all whom it may concern:*

Be it known that I, GUSTAVE O. MATTER, a citizen of the United States of America, and resident of the city of Portland, in the county of Multnomah, in the State of Oregon, have invented certain new and useful Improvements in Lock Nuts, of which the following is a specification, reference being had to the accompanying drawing.

My invention belongs to the class of lock nuts, but extends to means for locking a rotative threaded male member against rotation within its female member, whether the latter be in the form of a nut or whether it be in the form of a fixed plate apertured and threaded to accommodate the male member.

In this specification the term "nut" is used in the sense just indicated.

The object of my invention is to produce a simple, efficient, practicable and economical lock nut, in which the locking member is a specially devised pin, carried within a socket provided for it in the female member, in operative communication with the periphery of the male member.

What constitutes my invention will be hereinafter specified in detail and succinctly set forth in the appended claim.

In the accompanying drawing,

Fig. I is an elevational view showing my invention applied to a nut in which a bolt is inserted, the bolt being shown in cross section and the nut being partially broken away to more clearly disclose the invention.

Fig. II is a cross sectional view on the line 2—2 of Fig. I.

Fig. III is a view similar to Fig. I showing the locking pin out of operative position.

Fig. IV is a view showing a slight modification of the invention, and

Fig. V is a sectional view showing the invention applied to a plate instead of a nut for locking a tap bolt in the plate.

Referring to the numerals on the drawing, 1 indicates a threaded male member or bolt to which, in Figures I to V inclusive, a female member or nut 2 is shown as threaded. The bolt and nut may be of any usual dimensions threaded in any preferred manner, and the nut may be of any usual or preferred form.

Within the body of the nut, I provide a socket 3, transversely disposed to the longitudinal axis of the bolt-receiving aperture and cutting through the wall of the same on one side. The socket 3 is preferably of cylindrical form, such as may be made by an ordinary drill. Fitting movably but snugly within the socket is a locking member 4, whose chief distinctive feature consists in a curvilinear recess 5 of sufficient longitudinal extent to permit operative movement of the locking member transversely to the periphery of the bolt 1 when the bolt is threaded into the nut 2. The effect of the recess 5 is to constitute the member 4 into two elements that are set end to end and of which one is effective as a chock or wedge. The wall which defines the recess 5 is also preferably divided into two sections, namely, a serrated or toothed section 6, and a smooth section 7. The serrated section when forced into engagement with the periphery of the bolt 1 is adapted by its teeth as well as by its wedge shape to prevent the backward rotation of the nut upon the bolt. The longitudinal movement of the locking member 4 is adapted either to effect engagement with the bolt by the serrated section 6 of the member 4, or to allow the nut to turn freely when released therefrom, the smooth section 7, even though in contact with the periphery of the bolt, permitting such freedom of movement.

For imparting end-thrust to the locking member 4, and thereby to cause engagement between its serrated section 6 and the bolt, I employ any suitable means, preferably automatic, for example, an expansive coiled spring 8, seated at one end in the bottom of the socket 3, and pressing at the other end against the end of the member 4 that is encased within the socket.

Means for maintaining operative presentation of the recess 5 to the periphery of the bolt is necessary, the simplest means for that purpose being the flattened contour imparted to one side of the locking member 4 by the presence of the recess 5 formed therein, and clearly apprehensible from comparison of Figures I and II, for example, the flattening of contour referred to being sufficient to prevent the member from turning in its socket.

It is desirable, also, to provide means for confining the locking member 4 within its socket 3. The bolt 1, when joined to the nut 2, adequately performs that office, but the union of the member 4 and its containing member may be preserved, independently of the bolt 1, by other suitable retaining mechanism provided for that purpose. Examples of such retaining mechanism are shown in the drawings. In Figures II and III, the outer end of the socket 3 is shown as provided with terminal internal threads 10. Within the threaded end 10 of the socket is threaded a counter-sunk screw 11 provided with a kerf 12, by aid whereof it may be rotated and screwed into or out of the threaded end 10 of the socket.

Besides the office of holding the member 4 in place within its socket, the screw 11 also affords mechanical means for actuating the member 4 against the end-thrust of its spring 8.

In Figure I the screw 11 is shown as simply retaining the member 4 in place within its socket, and permitting the force of the spring 8 to act in the manner already described to cause engagement between the serrated section 6 of the member 4 and the periphery of the bolt.

In Figure III, the screw 11 is shown driven a sufficient distance into the threaded end of the socket 3 to effect compression of the spring 8 and release from engagement with the bolt of the member 4 by the teeth of the section 6 thereof.

In Figure IV, the co-operative members of my device shown therein are substantially identical with those shown in Figures I and II, with this variation, that the member 4 is therein provided, as to its outer end, with an oblique face 15, constituting an inclined plane against which the conical end 16 of a counter-sunk screw 17 may rotate, with driving effect, longitudinally upon the member 4. The functional effect of the screw 17 is the same as that of the screw 11, the only difference being in respect to the angle at which the screws are disposed to the member 4. In Figures I and III the screw 11 is coaxial with the member 4, while in Figure IV those members are at right angles one to the other.

In Figure V, I show a tap bolt 18 that is provided with a head 19 and which, passing through an intermediate plate 20, screws into an internally threaded aperture in a plate 21. The plate 21 corresponds to the nut 2 previously described, and is provided with a locking member 4, in like manner therewith. An edge of the plate 21 is, in Figure V, assumed to be available for the introduction into a socket provided in it, of a member 4.

If, however, the plate 21 is of such transverse extent as to render impracticable the introduction into it from one side of a member 4, this does not preclude the employment of my invention in connection therewith.

The operation of my invention will be clear from a reading of the above description of the arrangement of the several parts. In the form of the device shown in Figures I to III inclusive, the screw plug 10 will, in its position shown in Figure I, permit the spring 8 to throw the locking pin into engagement with the bolt and thereby to lock the bolt against movement. In the position shown in Figures III, the screw plug 10 holds the pin out of locking engagement with the bolt, and when the bolt is removed from the nut, will prevent the spring 8 from throwing the pin out of its socket. The operation of the form of the device shown in Figure IV is in all respects similar to that shown in the other figures, and the same holds true for the disclosure of Figure V.

What I claim is:

A nut lock consisting of the combination with a member having a threaded internal bore and a socket cutting transversely through and intersecting the threaded wall of said bore, of a longitudinally movable locking pin closely fitting within the socket having a longitudinally extending curvilinear recess forming two oppositely extending wedges positioned on opposite sides of the intersection of said socket and bore, one of the wedges being serrated to provide teeth adapted to engage the periphery of the threads of a bolt positioned in said bore, said teeth not extending between the threads of the bolt, means for longitudinally moving the pin to bring the serrated wedge into locking engagement with the periphery of the threads of a bolt, said pin terminating short of the open end of the socket and being of sufficient diameter to engage the periphery of at least two threads of the bolt whereby axial turning movement of the pin is prevented, and a screw plug extending into said socket at the end of the pin for actuating said pin in the opposite direction and for preventing displacement of the pin from the socket when the bolt is removed, both of said wedges being adapted to engage the threads of a bolt in said bore to prevent axial rotating movement of said pin in its socket, and one of said wedges being at all times in operative association with the bolt to prevent said turning movement.

In testimony whereof, I have hereunto set my hand in the presence of two subscribing witnesses.

GUSTAVE O. MATTER.

Witnesses:
LEICESTER B. ATKINS,
SARAH Z. RILEA.